April 24, 1934.   J. GRAVES   1,956,022
AUTOMATIC HANDLING MECHANISM FOR STORAGE BATTERY PANELS
Filed Jan. 2, 1931   6 Sheets-Sheet 1

Inventor
John Graves
By Bottum, Hudnall, Lecker, McNamara and Michael
Attorneys

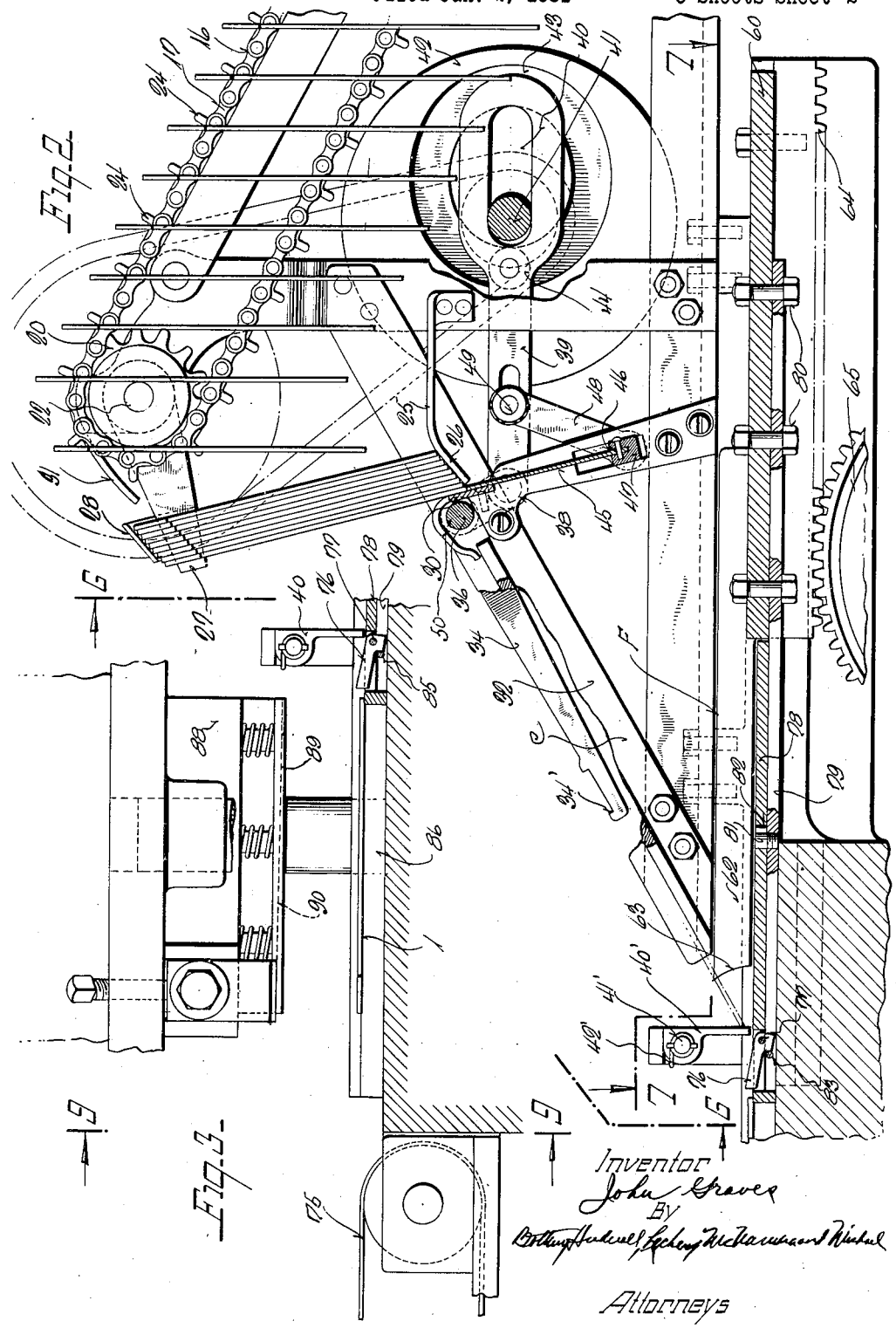

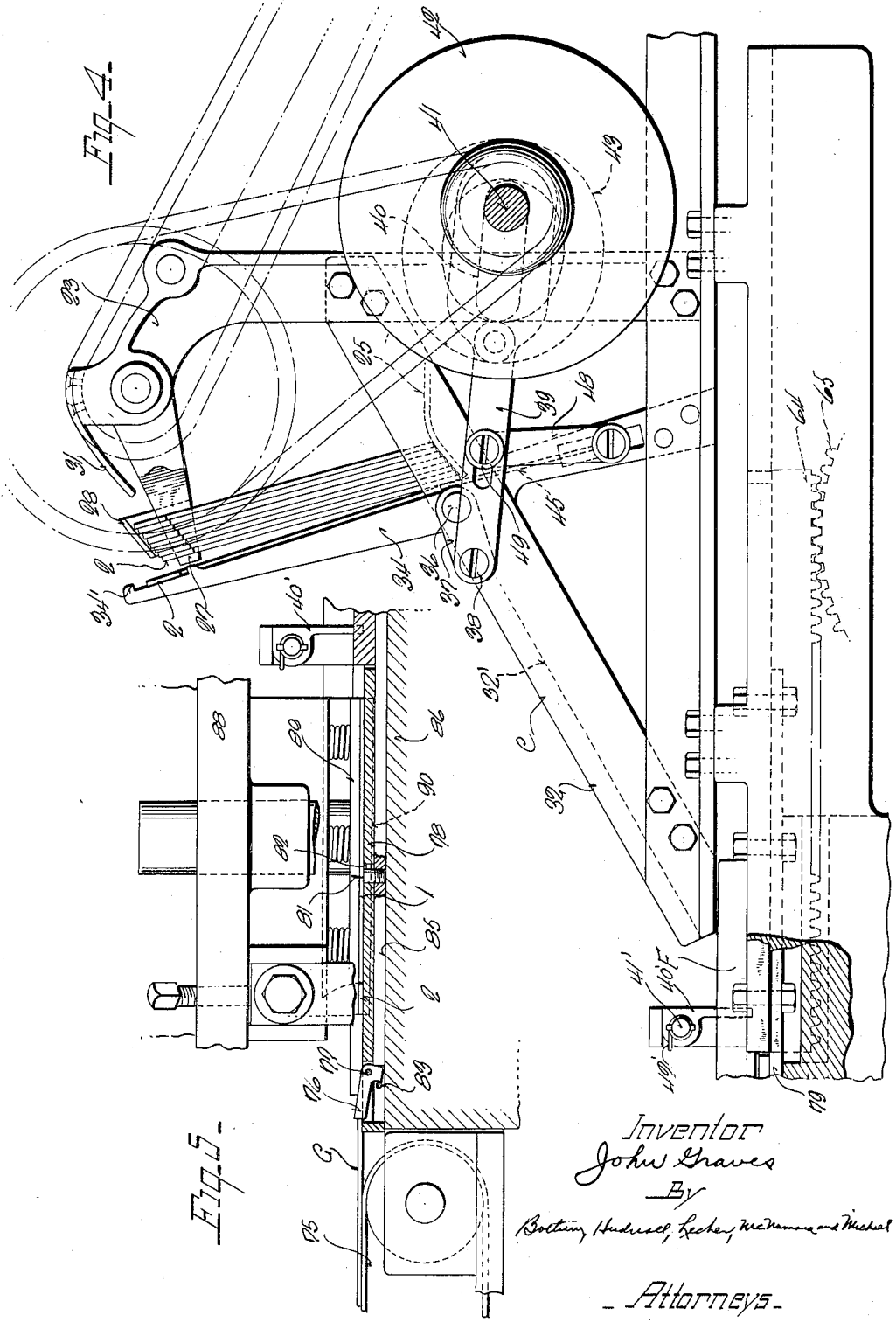

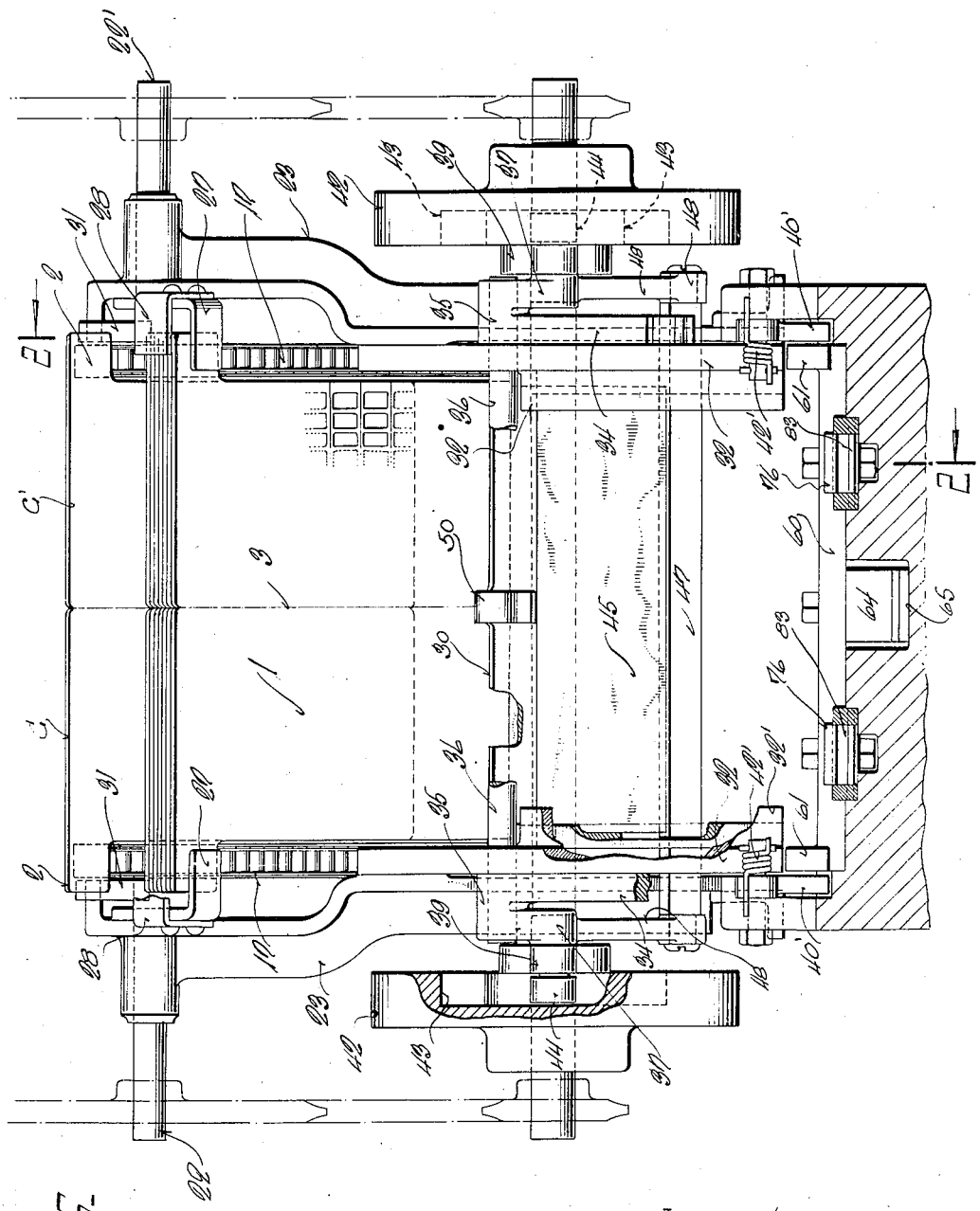

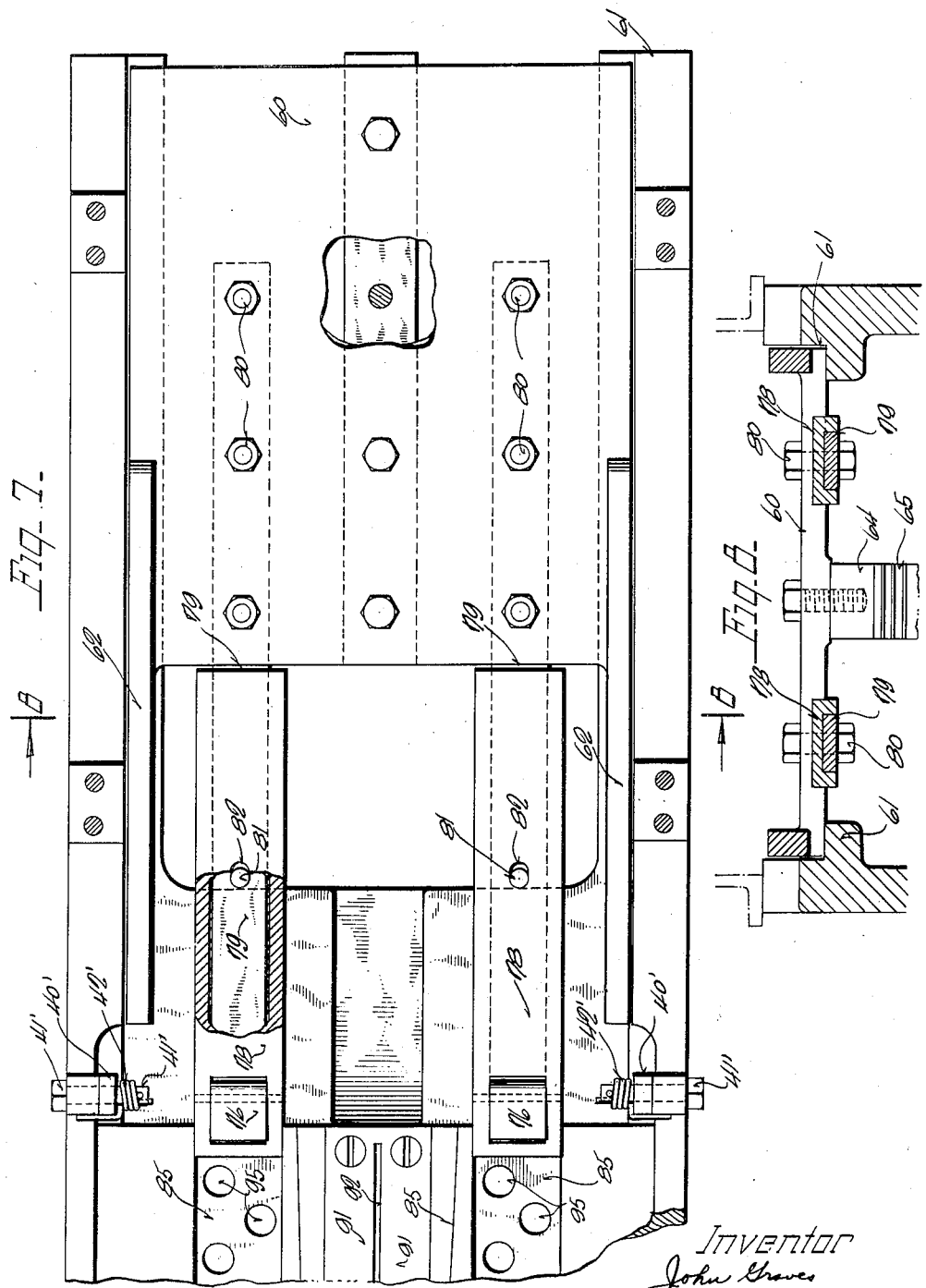

April 24, 1934.  J. GRAVES  1,956,022
AUTOMATIC HANDLING MECHANISM FOR STORAGE BATTERY PANELS
Filed Jan. 2, 1931  6 Sheets-Sheet 6
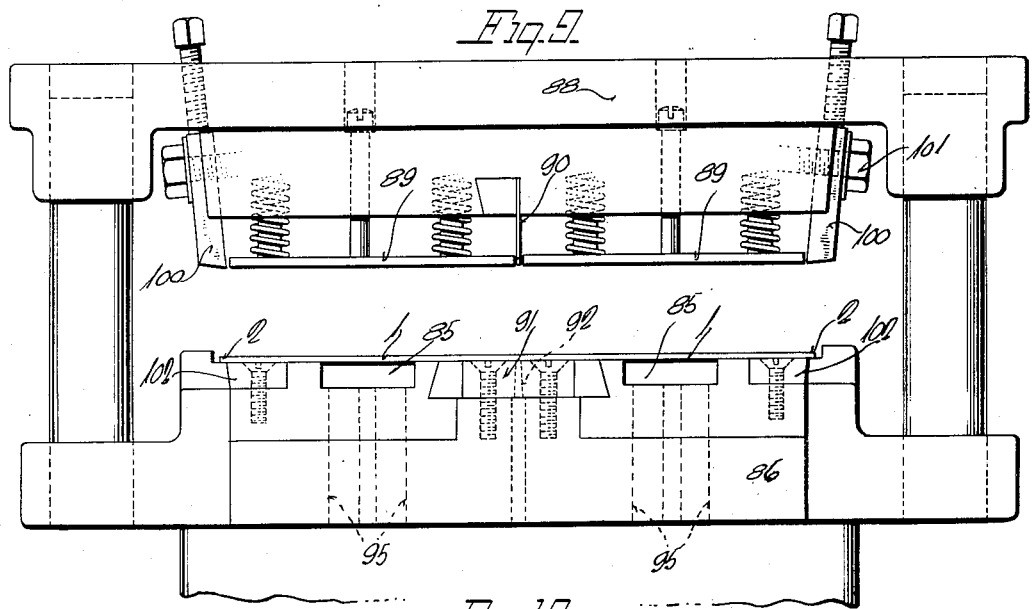
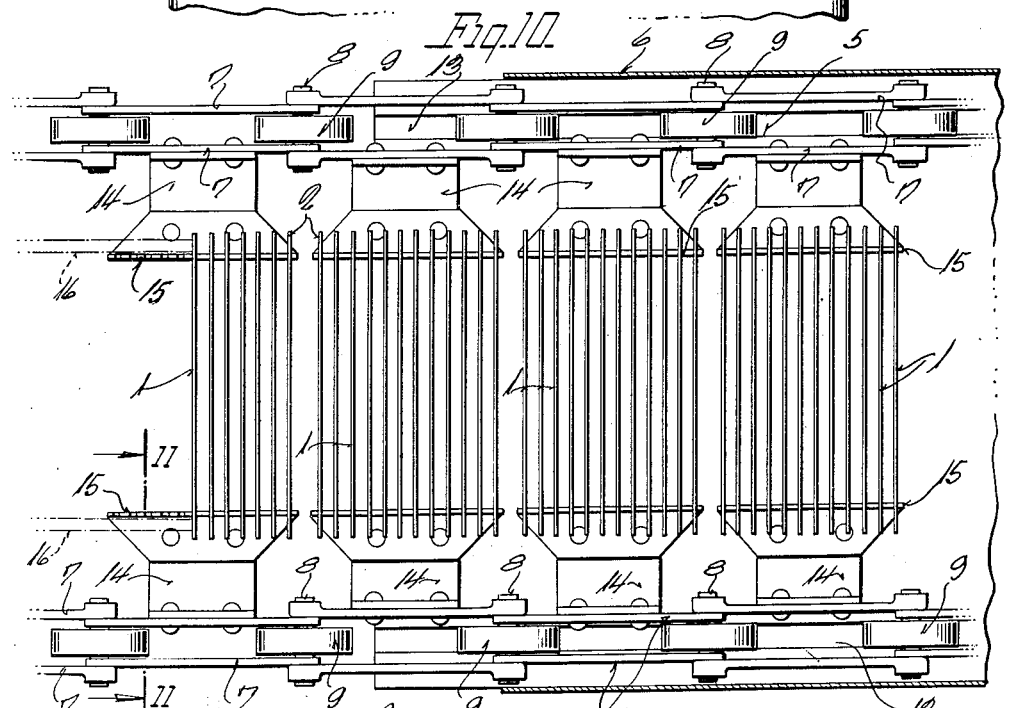

Patented Apr. 24, 1934

1,956,022

UNITED STATES PATENT OFFICE 1,956,022

AUTOMATIC HANDLING MECHANISM FOR STORAGE BATTERY PANELS

John Graves, Milwaukee, Wis., assignor to Globe-Union Mfg. Co., Milwaukee, Wis., a corporation of Wisconsin Application January 2, 1931, Serial No. 506,112

15 Claims. (Cl. 164—21)

This invention relates in general to the manufacture of storage batteries and more particularly to the production of plates for use in such batteries.

Among the objects of the present invention are to facilitate and speed up as well as render more economical the cost of producing the plates of a storage battery. This object is accomplished in general by enhancing the drying action to which the plates are subjected after being pasted and by eliminating manual handling of the plates during and after the drying operation and during their transfer from the dryer to the cutter. Throughout the operation, manual handling is avoided, the grids being retained in panel form from the time they are cast until they are ready for the burning operation and being mechanically handled during the drying and during their transfer and feed to the cutter press.

In carrying out the present invention the grids are cast in panel form with the grid lugs projecting from the opposite sides of the upper end of the panel. There is thus two grids in each panel. The grids are pasted to form the complete battery plates and are carried through the drying process in panel form, that is, each panel contains two battery plates. The pasting operation is speeded up as it is easier for the paster to apply the paste to the panels than it is to the separate grids. The retention of the plates in panel form during the drying process makes it possible to eliminate the trays or drying boxes, the oppositely projecting lugs of the plates being adapted for operative connection with an endless conveyor leading through the drying oven. At the discharge end of the oven a suitable transfer means, as for example, an elevating conveyor engages the lugs of the panels and carries the panel up into a storage station or storage rack. In the storage station the panels are supported in an inclined position ready to be delivered one by one to a transferring device which acts at the proper time, in conjunction with an ejecting mechanism, to carry the panels from the storage station or rack down into the control of a feeding mechanism. The feeding mechanism is in operative relation to a cutter and preferably embodies reciprocable panel feeders which act to feed the panels into a cutter or die and also to remove the plates from the die. The cutter separates each panel into its two plates and in addition shears a small amount of metal off of the ends of the lugs to provide clean material for the subsequent burning operations.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 2 is a fragmentary view in vertical section taken on line 2—2 of Figure 6 and showing the construction of the storage station or storage rack, the ejecting mechanism and transfer device and associated structure, parts being shown in elevation for the sake of illustration;

Figure 3 is view partly in section and partly in elevation illustrating the mechanism employed in the machine beyond the left hand end of Figure 2;

Figure 4 is a fragmentary view in side elevation showing the storage rack, transfer device and associated mechanism, but illustrating the transfer device in a different position from that shown in Figure 2;

Figure 5 is a view similar to Figure 3, but showing the feeding mechanism as positioned when a cut is being made;

Figure 6 is a view taken on line 6—6 of Figure 2, parts being broken away for the sake of illustration;

Figure 7 is a fragmentary plan view of the feeding mechanism, with the parts broken away for the sake of illustration;

Figure 8 is a view in transverse section on line 8—8 of Figure 7;

Figure 9 is a fragmentary view in end elevation looking in the direction of line 9—9 of Figure 3, and showing the cutter structure;

Figure 10 is a fragmentary view in top plan showing the conveyor employed in the drying oven; and Figure 11 is a fragmentary detail view in section taken on line 11—11 of Figure 10.

Figure 1:
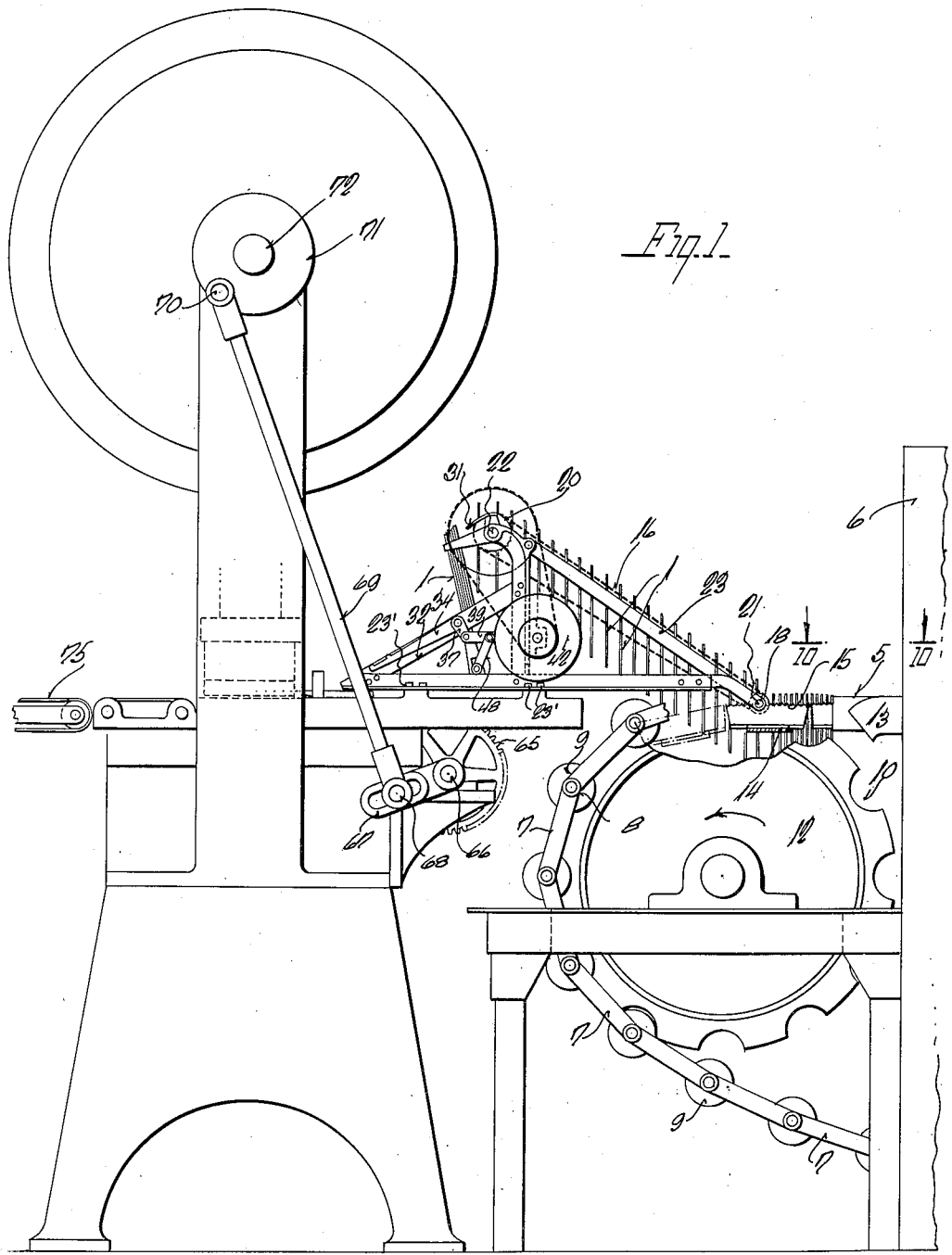
Figure 1 is a view in elevation showing the mechanism employed between the drying oven and the cutter for transferring the panels from the oven to the cutter.

As shown in Figure 6, the grids G and G' are cast in the form of a panel 1 having outwardly directed lugs 2 at the upper ends of its opposite sides. The grids are adapted to be severed or cut along line 3. In the panel form, the grids are pasted in the conventional manner and after the pasting operation, the resulting battery plates are deposited either by hand or by a suitable automatic loading mechanism on the conveyor designated generally at 5 and which runs through and projects slightly beyond the ends of a drying oven 6.

The conveyor 5 (see Figures 1, 10 and 11) consists of two transversely spaced and parallel endless chains 7, the pivot pins 8 of the links of the chains 7 carrying rollers 9 which engage in the notches 10 of the supporting and driving sprockets 12. The rollers 9 of the upper run of each chain ride in and along a track 13 (see Figure 11) to prevent sagging of the runs of the chain carrying the load. The links of the chains carry supporting brackets 14 having notched or grooved flanges 15 adapted to receive and support the lugs 2 of the panels 1. By carrying the plates in panel form through the drying oven and supporting them from their lugs 2 and in spaced relation to each other, better circulation of the air is had and the drying action is more efficient. In addition, the use of drying trays or boxes, and the handling involved in the use of such, is avoided.

At the discharge end of the oven a suitable conveyor, such as an elevating conveyor designated generally at 16 is provided and as shown in Figures 1, 2 and 6, comprises two endless sprocket chains 17 trained about idler sprocket wheels 18 and driving sprocket wheels 20 carried on shafts 21 and 22, respectively, the shafts 21 and 22 being supported for rotation in a frame structure designated generally at 23 bolted down to an extension of the bed or frame of the cutter as indicated at 23' in Figure 1. The links of the endless chains 17 are provided with lugs 24 (see Figure 2) which are engageable with the lugs 2 of the panels so that the panels are supported on the endless chains of the elevating conveyor and carried up by the conveyor in the manner illustrated in Figures 1 and 2.

At the upper or delivery end of the elevating conveyor a storage station or storage rack is provided for the panels and is constituted by a bottom plate 25 secured to and supported on frame 23 and formed at its forward end with a downwardly inclining portion 26. The storage rack also includes retaining bars 27 of angle formation carried by the upper portions of the side members of the frame 23 (see Figure 6) and inclining slightly downwardly from the horizontal. Top lugs 28 are carried by the retaining bars 27 and project inwardly over the panels in the storage rack just rearwardly of the bars 27. Just forwardly of the downturned end 26 of the bottom plate 25 a stop plate 30 is incorporated in the rack structure. The parts 25, 26, 27 and 28 serve to support a plurality of the panels 1 in the position shown in Figure 2. After leaving the conveyor 16, the panels are guided into the storage rack by guide strips 31 arranged at the sides of the conveyor and carried by the frame 23. The guide strips 31 slope gradually downwardly to insure an easy descent of the panels into the storage rack.

A slide or chute designated generally at C, extends downwardly from the storage rack to the feeding mechanism designated generally at F. This slide or chute is made up of a pair of side rails 32, the upper end of each side rail being fastened to an upright side member of the frame 23 and the lower end of each side rail being fastened to the base member of this frame 23. The panels 1 are taken one by one from the storage rack or storage station and are carried down on to the side rails of the slide and permitted to slide by gravity down into the path or into the field of operation of the feeding mechanism. For accomplishing this purpose a transfer device is provided and consists of two transfer arms 34 spaced apart a distance slightly in excess of the width of the body of the panel so as to be adapted to engage the lugs 2 of the panels 1. These arms 34 are positioned on the outsides of the rails 32 of the chute or slide and have bearing portions 35 mounted for rotation on a supporting shaft 36 carried by the side rails 32. The outer ends of the arms 34 are notched as at 34' to receive and effectively engage the lugs of the panels. Suitably connected with the transfer arms 34 are crank arms 37. For the sake of simplicity in illustration the crank arms 37 are shown as being formed integral with the bearing portions of the carrier arms 34, but in this instance as in others, details of the particular design may be varied. The outer ends of the crank arms 37 are pivotally connected as at 38 to connecting rods 39. These rods 39 have slotted portions 40 slidably receiving a shaft 41 which has fixed thereto, cams 42, there being one cam 42 for each connecting rod 39. Camways or cam grooves 43 are provided in the cams 42 and receive rollers 44 mounted on the connecting rods 39 and projecting laterally therefrom and into the grooves. The cam-ways 43 are shaped and designed to cause the arms 34 to swing from the position shown in Figure 2 up to the position shown in Figure 4 to receive a panel ejected from the storage rack by the ejecting mechanism (which will be later described) and then to swing back down into the position shown in Figure 2 and below the side rails 32 to deposit the lugs 2 of the panels in the side rails and permit the panels to slide down to the lower end of the slide or chute C and into engagement with yieldable stops 40'. Stops 40' are pivotally mounted as at 41' and are held in position to arrest the movement of the panels by light springs 42'. During the travel of the panels down the chute or slide C, their lugs 2 ride on the tops of the slide rails 32 and the bottom ends of the panels slide on flanges 32' which may be formed integral with the side rails of the slide and which project inwardly and laterally from the side rails.

Considering Figures 2 and 4 of the drawings it will be understood that in order to deliver a panel from the storage rack or storage station to the transfer arms 34, it is necessary to lift the panel to such extent that its lower edge clears the upper edge of the stop plate 30 and its lugs 2 clear the inturned ends of the retaining bars 27 of the rack. For this purpose, an ejector plate 45 is provided and is slidable along the stop plate 30. The ejector plate 45 is positioned so that the foremost panel has its bottom edge resting on the top edge of the plate 45. The lower edge of the ejector plate 45 is received and secured in a slot 46 provided in a transverse bar 47. The ends of the bar 47 are pivotally connected to the lower ends of links 48. The upper ends of the links 48 are connected to the connecting rods 39 by pin and slot connections 49. It will be noted that the connecting rods 39 do not partake of rectilinear or straight line motion, but due to their connection at their forward ends with the crank arms 37, not only move back and forth, but also up and down. The up and down movement of the connecting rods 39 is utilized to raise and lower the ejector plate 45 since this up and down movement is transmitted to the ejector plate through the links 48. By virtue of the provision of the pin and slot connection or lost motion connections between the links 48 and the connecting rods 39, these connecting rods 39 may move to swing the transfer arms 34 up into position to receive the panels before the ejector plate 45 elevates the panel to be delivered to the transfer device sufficiently to release it from the storage rack.

When the transfer arms 34 swing downwardly to carry a panel from the storage rack over onto the slide, the lower edge of the panel travels over a guide finger 50 which may conveniently be provided upon the central portion of the stop plate 30.

The feeding mechanism F comprises a body plate 60 slidably mounted in guides 61 (see Figures 7 and 8) and provided at its forward end with feeding fingers 62, the fingers 62 being integrally formed with or otherwise rigidly connected to the body plate 60 and projecting from the sides of the forward end of the plate. The forward ends of the feeding fingers 62 are undercut as at 63 to insure effective engagement between these feeding fingers and the lugs 2 of the panels (see Figure 2). The plate 60 and its fingers 62 are reciprocated by means of a rack 64 secured to the under side of the plate and meshing with an oscillating gear 65 secured on a shaft 66. The shaft 66 is provided with a crank arm 67 adjustably connected as at 68 to the lower end of the connecting rod 69, the upper end of which rod 69 is connected with the crank pin 70 projecting outwardly from the crank disc 71 secured to the projecting end 72 of the main shaft of the cutter press (see Figure 1). The feed fingers 62 work back and forth under the lower ends of the side rails of the slide or chute C and when these fingers move to the left as shown in Figure 2, they encounter the lugs 2 of the panels and consequently cause the panels to move with them, the stops 40' yielding to permit movement of the panels along with the feed fingers and on to the bed of the cutter.

For the purpose of automatically removing the grids cut from the panels from the bed of the cutter and pushing these grids over on to an inspection or take off belt 75, dogs 76 are pivotally mounted as at 77 on slides 78 (see Figures 2 and 7). The slides 78 are of U-shaped form in transverse cross section (see Figure 8) and are supported for sliding longitudinal movement on actuating strips 79. The actuating strips 79 are bolted as at 80 to the under side of the body plate 60 and have driving pins 81 projecting up through slots 82 in the slides 78. This loose connection between the slides and their actuating strips 79 permits the forward ends of the strips 79 to coact with the dogs 76 to regulate their projection or retraction. The extent of projection of the dogs 76 is limited by stop pins 83 carried by the slide 78 (see Figure 2). The dogs 76 are biased to retracted position by virtue of their own weight and are projected when the forward ends of the strips 79 strike the depending portions of the dogs.

The slides 78 and their strips 79 travel in ways or grooves 85 provided therefor in the bed 86 of the cutter and when moved to the left as viewed in Figures 2, 5 and 7, act through their dogs 76 to push the grids off of the bed and on to the inspection belt 75. This action occurs after each cutting operation.

The cutter comprises the bed 86 and a reciprocable cutter head 88, the head 88 carrying spring projected pressure pads 89 and an inclining or beveled shearing knife 90 (see Figures 3, 5 and 9). The pressure pads 89 are disposed downwardly or in advance of the edge of the shearing knife so that when the head 88 descends the pressure pads first engage the plates of the panel and hold these plates firmly in position during the subsequent cutting action carried out by the blade 90 and cooperable cutters 91 secured in the bed 86 and flanking a slot 92 accommodating blade or knife 91. (Compare Figures 7 and 9). The inclining formation of the knife edge 90 insures a clean, easy cut and prevents pellets or paste from being dislodged from the plates. Any powdery particles of the paste that may be rubbed off the plates drops through holes 95 formed in the bed of the press and leading downwardly from runways 85.

Simultaneously with the severing of the panel into the two plates, excess metal is cut off from the ends of the lugs 2 to provide clean metal for the burning operation. This cutting of the metal from the lugs is accomplished by means of cutters 100 secured as at 101 to the cutter head and cooperating with fixed cutters 102 secured to the bed of the cutter press.

From the foregoing it will be understood that the panels are carried through the drier in such manner as to enhance the drying action and as to eliminate the necessity of employing drying racks or boxes. At the discharge end of the drying oven the panels are automatically taken from the conveyor of the drying oven, carried up into a storage rack, delivered one by one to a transfer device and carried by the transfer device over on to a chute which leads down to the feeding mechanism. The feeding mechanism is synchronized in its action with the action of the cutter and serves to feed the panels at the proper time on to the bed of the cutter. After the panels are cut into plates, they are removed from the bed of the cutter without the necessity of the operator placing his hand beneath the knife.

The transfer device, and its cooperable conveyor 16 are synchronized in their action with the conveyor of the drying oven and all of these instrumentalities are synchronized in their action with the cutter press. This may be accomplished by driving the cutter press and the conveyor of the drier at proper relative speeds and taking the drive for the shaft 41 from the conveyor drive.

The invention claimed is:

1. A machine for transferring pasted grid panels from a conveyor of a drying oven to a cutter press and comprising a second conveyor having means cooperable with the lugs of the panels for picking up the panel from the oven conveyor, a storage rack for receiving the panels from said second conveyor, feeding mechanism operated in synchronism with the cutter press and means for transferring the panels from the storage rack to the feeding mechanism.

2. A machine for transferring pasted grid panels from a conveyor to a cutter press and comprising an elevator conveyor having means cooperable with the lugs of the panels for picking up the panel from said first named conveyor, a storage rack for receiving the panels from the upper end of the elevator conveyor, feeding mechanism operated in synchronism with the cutter press, means for transferring the panels from the storage rack to the feeding mechanism and comprising an ejector for displacing the panels one by one from the storage rack, a transfer device receiving the panels as they are ejected from the storage rack and a slide on which the panels are deposited by the transfer device, said slide being arranged in cooperative relation to the feeding mechanism.

3. A machine for transferring pasted grid panels from a drying oven to a cutter and comprising a conveyor for picking up the panels from the oven, a storage rack receiving the panels from the conveyor and having means for supporting the panels in an inclined position, feeding mechanism operated in synchronism with the cutter and including reciprocable panel feeders supported in cooperative relation to the cutter and below the storage rack, a slide between said storage rack and said feeding mechanism and terminating at its lower end adjacent the path of movement of said panel feeders, a swingable transfer device for carrying panels from the storage station to the slide, an ejector for delivering the panels one by one from the supporting means of the supporting rack to the transfer device, and means for coordinately actuating the transfer device and ejector.

4. In a machine of the character described for use with panels and including a storage rack, means for delivering the panels to the storage rack, a slide leading from the storage rack to a feeding mechanism, an ejector for displacing the panels one by one from the storage rack, swingable transfer arms for taking the panels displaced by the ejector and transferring them to the slide, crank arms connected to the transfer arm, connecting rods pivotally connected to the crank arms, cam means for operating the connecting rods and links pivotally connected to the ejector and having a lost motion connection to the connecting rods.

5. A machine for transferring pasted grid panels from a conveyor of a drying oven to a cutter press and comprising a storage rack, means for carrying the panels from the conveyor of the drying oven to the storage rack, feeding mechanism operated in synchronism with the cutter press, an ejector for displacing the panels one by one from the storage rack, swingable transfer arms for taking the panels displaced by the ejector and moving them into the control of the feeding means and means for coordinately actuating the ejector and transfer arms.

6. A machine for drying pasted panels and severing them into grids adapted for use in a storage battery and comprising a drying oven, a conveyor extended through the drying oven and having means engageable with the lugs of the panels for supporting the panels and carrying them through the drying oven, a cutter press, feeding mechanism for the cutter press and means cooperating with the lugs of the panels for taking the panels from the conveyor and delivering them one by one to the feeding mechanism.

7. In a machine of the character described, a cutter press including a bed having fixed cutters and a reciprocable cutter head having cooperable movable cutters for severing panels into grids, and means for feeding panels to the bed of the cutter press and removing the grids from the bed and comprising a reciprocable member having feed fingers cooperable with the panels for pushing them on to the bed of the press, grid engaging dogs, slides on which said dogs are pivotally mounted and actuating strips secured to the reciprocable member and loosely connected to the slides and engageable with the dogs for regulating the projection and retraction thereof.

8. A machine of the character described, including a drying oven having a conveyor provided with means adapted to engage and support a panel by its lugs, a cutter press, and means cooperable with the lugs of the panels for automatically taking them from the conveyor of the drying oven and feeding them one by one to the cutter press.

9. A machine of the character described comprising means cooperable with lugs of a panel for taking them from a dryer, a storage rack to which the panels are delivered by said means, feeding mechanism for a cutter press and means for transferring the panels from the storage rack to the feeding mechanism.

10. Feeding mechanism for a cutter press operable to sever a panel into two grids and comprising reciprocable feed members slidable back and forth across the bed of the cutter press and adapted to engage the lugs of the panels to feed the panels onto the bed of the press.

11. Feeding mechanism for a cutter press operable to sever a panel into two grids and comprising reciprocable feed members slidable back and forth across the bed of the cutter press and adapted to engage the lugs of the panels to feed the panels onto the bed of the press, and means actuated in synchronism with the feeding members to push the severed grids from the bed of the press.

12. Feeding mechanism for a cutter press operable to sever a panel into two grids and comprising reciprocable feed members slidable back and forth across the bed of the cutter press and adapted to engage the lugs of the panels to feed the panels onto the bed of the press, and means actuated in synchronism with the feeding members to push the severed grids from the bed of the press, and consisting of grid engaging dogs also movable across the bed of the cutter press and automatically projected and retracted during their operative and return movements across the bed of the press.

13. A machine of the character described for carrying panels through a dryer and feeding them to a cutter press and comprising a conveyor extending through the dryer and having means engageable with the lugs of the panels for supporting panels and carrying them through the dryer, feeding mechanism for the cutter press and means between the feeding mechanism and the conveyor and cooperable with the lugs of the panels for transferring the panels from the conveyor to the feeding mechanism.

14. Automatic mechanism for handling pasted grid panels and feeding them to a cutter press comprising a conveyor having means cooperable with the lugs of the panels for picking them up and conveying them, a storage station receiving the panels from the conveyor, feeding mechanism operated in synchronism with the cutter press and cooperable with the lugs of the panels for feeding them to the cutter press and means for delivering the panels one by one from the storage station to said feeding mechanism.

15. Feeding mechanism for a cutter press operable to sever a pasted grid into two grids and comprising reciprocable feed members having feeding fingers engageable with the lugs of the panels to feed the panels onto the bed of the press, and means movable with and in advance of said fingers to push the severed grids off of the bed of the press.

JOHN GRAVES.